United States Patent
Wu et al.

(10) Patent No.: US 9,471,558 B2
(45) Date of Patent: Oct. 18, 2016

(54) GENERATION OF INTRODUCTORY INFORMATION PAGE

(71) Applicant: RAKUTEN KOBO INC., Toronto (CA)

(72) Inventors: James Wu, Toronto (CA); Anthony O'Donoghue, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 275 days.

(21) Appl. No.: 14/061,258

(22) Filed: Oct. 23, 2013

(65) Prior Publication Data

US 2015/0113386 A1 Apr. 23, 2015

(51) Int. Cl.
*G06F 17/00* (2006.01)
*G06F 17/24* (2006.01)
*G06Q 30/02* (2012.01)
*G06F 3/0484* (2013.01)
*G06F 3/0481* (2013.01)
*G06F 17/22* (2006.01)
*G06F 17/30* (2006.01)

(52) U.S. Cl.
CPC ......... *G06F 17/248* (2013.01); *G06F 3/04817* (2013.01); *G06F 3/04842* (2013.01); *G06F 17/2229* (2013.01); *G06Q 30/0256* (2013.01); *G06Q 30/0276* (2013.01); *G06F 17/30719* (2013.01)

(58) Field of Classification Search
CPC .................. G06F 17/30991; G06F 17/30719; G06F 17/248
See application file for complete search history.

(56) References Cited

U.S. PATENT DOCUMENTS

| | | | |
|---|---|---|---|
| 2007/0162845 A1* | 7/2007 | Cave ..................... | G06F 17/218 715/209 |
| 2008/0070526 A1* | 3/2008 | Donahue ............. | H04L 12/5855 455/187.1 |
| 2008/0109232 A1* | 5/2008 | Musgrove .............. | G06Q 30/02 705/317 |
| 2012/0030227 A1* | 2/2012 | Mital ................ | G06F 17/30867 707/767 |

\* cited by examiner

*Primary Examiner* — Andrew McIntosh
(74) *Attorney, Agent, or Firm* — Oblon, McClelland, Maier & Neustadt, L.L.P

(57) ABSTRACT

A system and method for automatically generating a commodity introductory document that encompasses personalized subject matter as well as related information acquired from external information sources. A predetermined template comprising user-authored sections and automated sections is used to select and organize the information. The GUIs corresponding to the user-authored sections allow an introductory document author to provide personalized input. The automated sections are linked to information sources through embedded hyperlinks, from which relevant information can be identified and derived to populate the automated sections. The introductory document author may be provided with a few options regarding the layout and the presentation of the indicatory document as well as individual sections thereof.

20 Claims, 17 Drawing Sheets

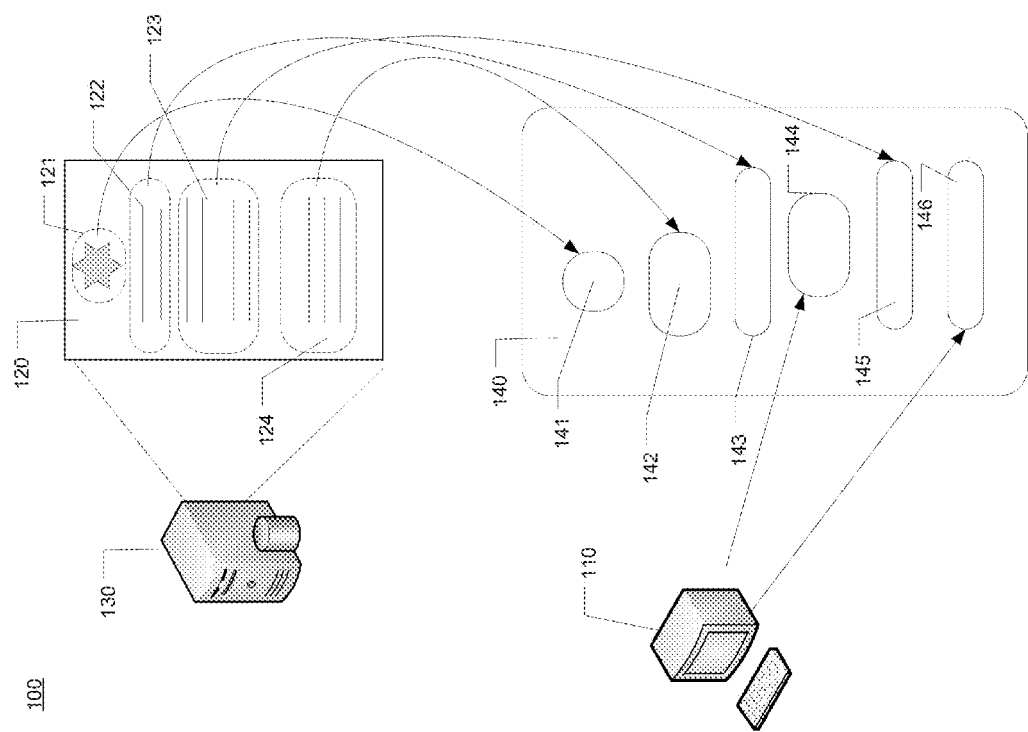
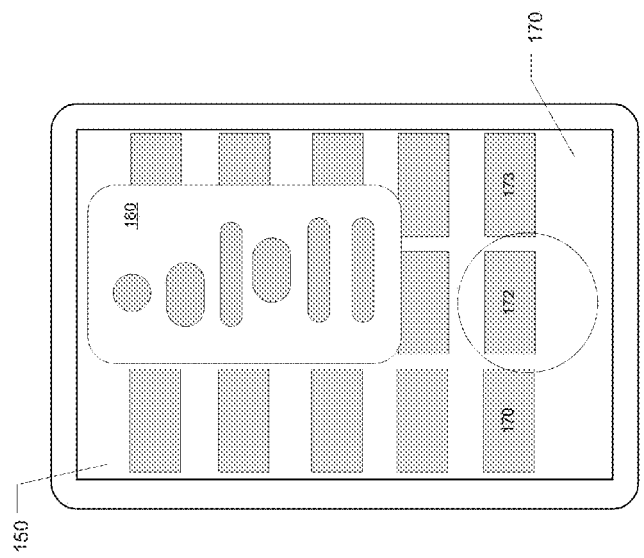
Fig. 1A
Fig. 1B

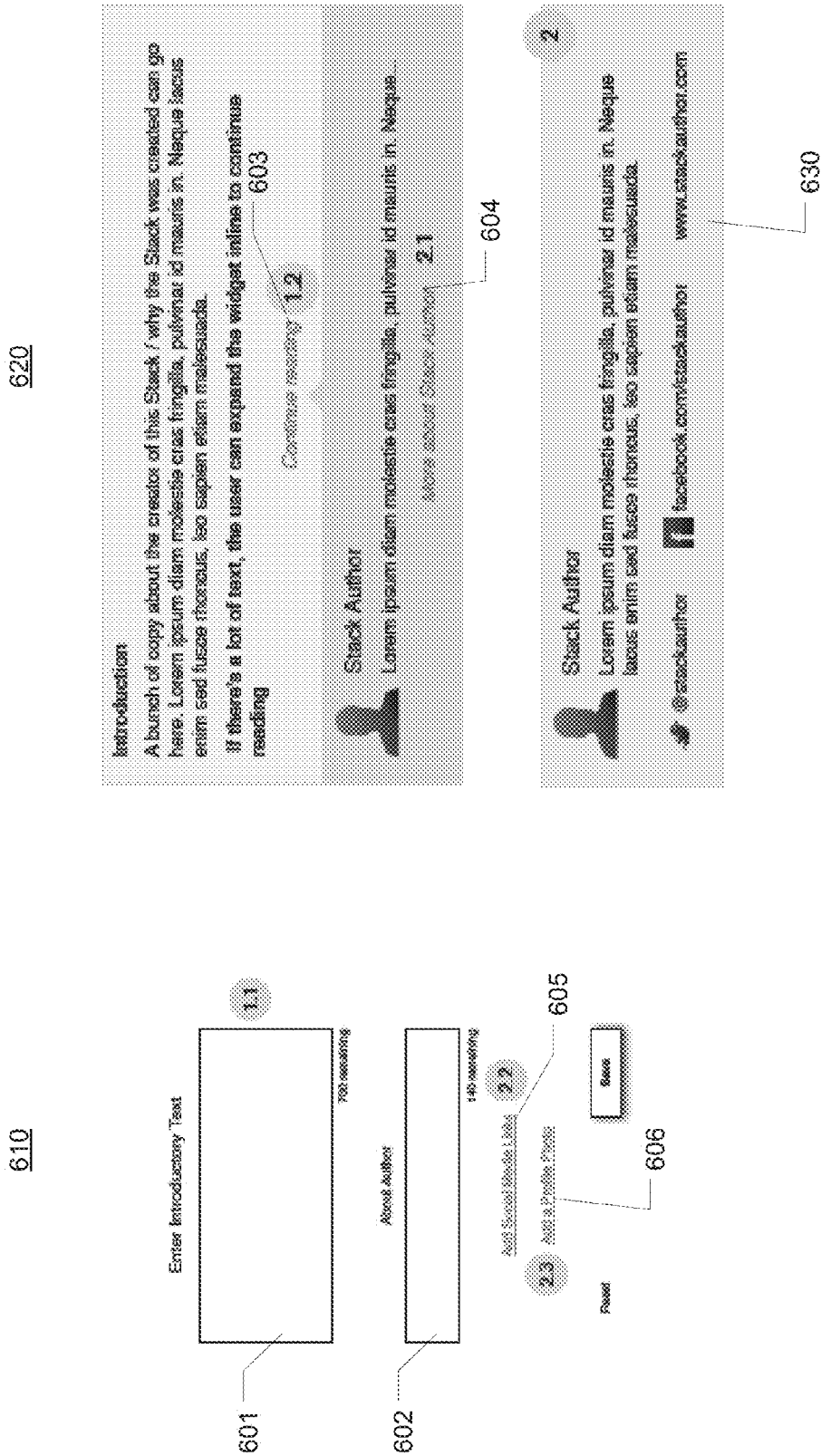

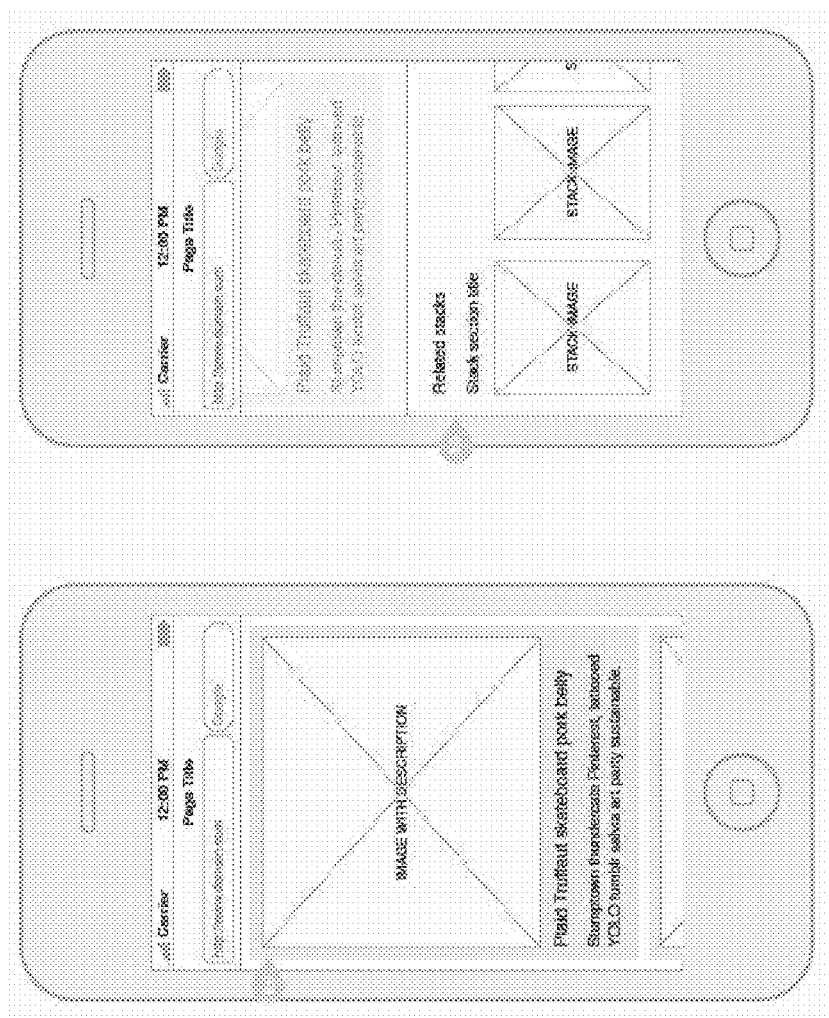

GENERATION OF INTRODUCTORY INFORMATION PAGE

CROSSREFERENCES

The present disclosure is related to: the co-pending patent application titled "PRESENTING AN AGGREGATION OF ANNOTATED TERMS IN EBOOK," filed on Aug. 12, 2013 and Ser. No. 13/964,791; and the co-pending application titled "PRESENTING EXTERNAL INFORMATION RELATED TO PRESELECTED TERMS IN EBOOK," filed on Aug. 12, 2013 and Ser. No. 13/924,739. The foregoing patent applications are herein incorporated by reference for all purposes.

TECHNICAL FIELD

The present disclosure relates generally to the field of e-commerce, and, more specifically, to the field of generating a collection of information related to commodity.

BACKGROUND

In an on-line store, a commodity offered for sale is often presented along with some related information, such as product specifications and descriptions or reviews from prior customers, which can be used by a potential buyer to make a purchase-related decision. Conventionally, the related information as presented usually originates from limited resource, e.g., solely by the particular on-line store, and focuses only directly on the commodity. For example, a book item for sale is typically only presented with a book cover, an introduction, readers' reviews, a price and the like.

However, a large amount of additional information that is readily available on the internet and hosted by other websites may also be useful to influence a customer's purchase-decision, such as a background story that motivates the writing of a book, information regarding the author, related books of the author or of the subject, etc. Conventionally, a potential buyer often needs to visit other websites to personally acquire additional information before making a decision, which may be cumbersome and prolong or stall his or her decision making process.

Moreover, in the book selling context, the presented related information typically lacks personalized input of an author or editor of the book, and thus rarely reflects his or her personal messages regarding the book. However, such input may play an important role in intriguing potential buyers and thereby promoting the book for sale.

SUMMARY OF THE INVENTION

Therefore, it would be advantageous to provide a mechanism of automatically generating an aggregation of information relevant to a commodity that sources from one or more external information sources and personalize input.

Accordingly, embodiments of the present disclosure employs a computer implemented process of generating an introductory document, e.g., a personalized stack, for a commodity by use of a predetermined template, e.g., a website template that comprises user-authored sections and automated sections. Each automated section may be associated with respective field indexes indicating information fields. The user-authored sections allow a stack author, such as a writer or an editor of a book, to provide personalized input to the introductory document. The automated sections are linked to information sources which may be specified by the stack author, e.g., from embedded hyperlinks, from which relevant information can be identified to populate respective automated sections in the introductory document. A user may be provided with a few options regarding the layout and the presentation of the indicatory document as well as individual sections thereof.

In one embodiment of the present disclosure, a computer implemented method of generating an introductory document for a commodity comprises: (1) accessing a predetermined template that comprises a plurality of sections arranged in respective page locations, wherein each section is associated with a respective field index, wherein the plurality of sections comprise user-authored sections and automated sections; (2) rendering a first graphic user interface (GUI) for display in response to a corresponding user request, wherein the first GUI is associated with a first user-authored section and comprises a visual object configured to receive user input; (3) accessing one or more information sources; (4) selecting relevant information from the one or more information sources for respective automated sections based on respective field indexes associated therewith, wherein the relevant information pertains to the commodity; (5) associating the relevant information with respective automated sections; and (6) generating the introductory document that comprises the user input assigned to the first user-authored section and the relevant information assigned to the respective automated sections. The one or more information sources may be selected from a group consisting of a digital encyclopedia database, a local information database, a website hosted by another user. The one or more information sources are predetermined based on the commodity. The commodity may be in a category selected from a group consisting of a book, a song, a piece of art, a movie, a TV show, or a combination thereof. The user-authored sections comprise a hero image section, an introductory document title section, an introductory text section, and user-defined sections, wherein the user-authored sections comprise required sections and optional sections, and wherein the automated sections comprise a rating section, a related information section, and an author information section. The method may further comprise removing a user-selected section from the introductory document in response to user instructions. The introductory document may be generated in accordance with a layout that is selected from a plurality of layout options provided by the predetermined template. The first GUI may comprise a menu object configured to receive a user selection from predefined options with respect to a presentation format of the user input in the introductory document. The introductory document may be associated with an identification that is discoverable by a web search engine. The user input may comprise an image file, a video file, an audio file, a typed writing, or a selection from a list of options provided by the predetermined template.

In another embodiment of the present disclosure, a non-transitory computer-readable storage medium embodying instructions that, when executed by a processing device, cause the processing device to perform a method of generating an introductory page for a selected commodity, the method comprising: (1) accessing a predetermined page layout that comprises a plurality of fields arranged in respective page locations, wherein each field is associated with an information category, wherein the plurality of fields comprise user-authored fields and automated fields; (2) rendering a menu graphic user interface (GUI) for display, wherein the menu GUI comprises clickable objects associated with the plurality of fields respectively; (3) rendering a respective GUI for display in response to a user interaction with a clickable object corresponding to a user-authored field, wherein the respective GUI comprises a user input region configured to receive a user input; (4) accessing information sources; (5) selecting relevant information pertaining to the selected commodity for respective automated fields from the information sources based on corresponding information categories associated with the respective automated fields; (6) assigning the relevant information to the respective automated fields; and (7) generating an introductory page comprising the user input and the relevant information that are arranged in respective fields in accordance with the predetermined page layout.

In another embodiment of the present disclosure, a system comprises: a processor; a communication circuit; and a memory coupled to the processor and comprising instructions that, when executed by the processor, cause the system to perform an method of generating an information page for an electronic book, the method comprising: (1) accessing a predetermined template that comprises a plurality of sections arranged in respective page locations, wherein each section is associated with a field index, wherein the plurality of sections comprise user-authored sections and automated sections; (2) rendering a first graphic user interface (GUI) for display in response to a corresponding user interaction with the display device, wherein the first GUI is associated with a first user-authored section and comprises an input entry area configured to receive user input; (3) accessing one or more information sources; (4) selecting relevant information from the one or more information sources for the automated sections based on respective field indexes associated with the automated sections, wherein the relevant information pertains to the electronic book; (5) associating respective relevant information with each automated section according to the predetermined template; and (6) generating the information page that comprises the user input and the relevant information based on the predetermined template.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 1A is a diagram depicting an exemplary process of automatically generating an introductory page including a collection of relevant commodity information derived from an external information source and personalized input by a stack author in accordance with an embodiment of the present disclosure.

FIG. 1B is a diagram depicting an exemplary on-screen presentation of an introductory document of generated in accordance with an embedment of the present disclosure.

FIG. 6A illustrates an exemplary on-screen GUI designed for book items and configured to receive input for an "introduction" section and the "stack author" section from a stack author in accordance with an embodiment of the present disclosure.

FIG. 6B illustrates exemplary outcome "introduction" section and the "stack" section populated with personalized input as shown in FIG. 6A in accordance with an embodiment of the present disclosure.

FIG. 13D illustrates another exemplary "hero widget" section GUI displayed on a smart phone device generated in accordance with an embodiment of the present disclosure. This GUI displays additional content items chosen by a device user.

FIG. 13E illustrates an exemplary "related stacks" GUI displayed on a smart phone device generated in accordance with an embodiment of the present disclosure.

DETAILED DESCRIPTION

Figure 2:
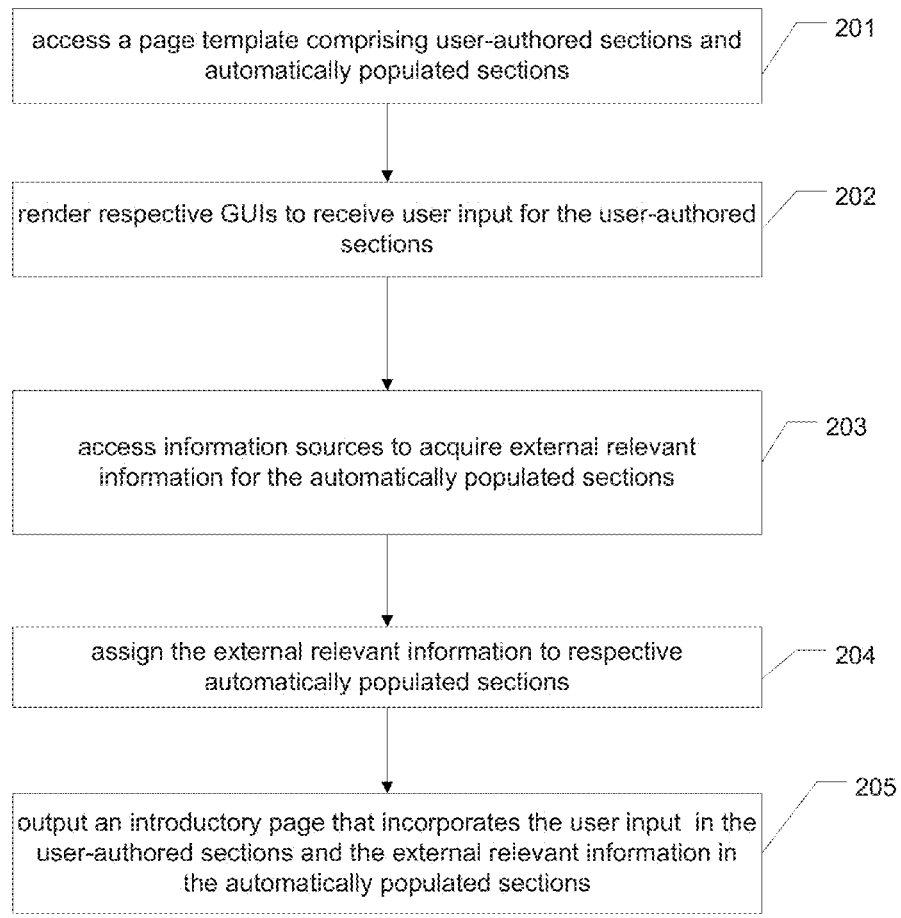
FIG. 2 is a flow chart illustrating an exemplary computer implemented method of generating an introductory document for a commodity by incorporating external information and personalized subject matter in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Generation of Introductory Information Page

FIG. 1A is a diagram depicting an exemplary process 100 of automatically generating an introductory page including a collection of relevant commodity information derived from an external information source and personalized input by a stack related author in accordance with an embodiment of the present disclosure. The relevant information is partially automatically acquired from the external information source 130, e.g., through embedded hyperlinks upon a generation process 100 being activated, and is partially provided by the stack author through graphic user interfaces (GUIs) rendered on a computing device 110. A predefined template 140 is utilized to select and organize the relevant information based on predetermined information fields and page layout. The template 140 includes a plurality of automated sections or user-authored sections to be populated by the external information and the user-authored information respectively.

According to the illustrated example, the predefined template 140 includes automated sections 141, 142, 143 and 145, and user-authored sections 144 and 146. During an introductory document generation process, an external document 120, e.g., a webpage entry, that is stored in the information source 130, e.g., a server machine, and contains relevant information regarding the commodity, can be identified and accessed. The external document 120 is fed to the predefined template 140 which includes automated sections organized in respective page locations and corresponding to respective fields of information to be populated. The automated sections in the template 140 may be aligned with field indexes assigned to the segments, e.g., 121, 124, 122, and 123, of the document 120. According to the illustrated example, the sections 141, 142, 143 and 145 are automatically populated with information from respective segments of the document 120, respectively through a field index mapping process for example.

On the other hand, the user-authored sections 144 and 146 can be populated with personalized user input by a stack related author through corresponding GUIs, as to be described in greater detail below. The stack author may be any person who is qualified and authorized to provide information regarding the commodity, such as a product developer or retailer, a service provider, a book editor or author, an artwork creator, and so on. Therefore, an outcome introductory document, or a personalized stack, can be automatically generated and advantageously includes relevant information sourced from one or more external information sources and personalized subject matter provided by a stack author.

As will be appreciated by those skilled in the art, a resultant introductory document generated according to the present disclosure can then be circulated through any suitable channel and presented in any suitable manner, e.g., as a printed document alone or attached with the commodity, or an electronic document linked to a commodity presented on an on-line store.

Such an introductory document, in whole or in part, may be made available for internet discovery or search, and upon discovery, can be displayed in conjunction with the subject commodity on an on-line store webpage for example. The present disclosure is not limited to any specific method or context that can trigger the display of an introductory document on an electronic device. FIG. 1B is a diagram depicting an exemplary on-screen presentation of an introductory document 160 generated in accordance with an embedment of the present disclosure. As illustrated, a webpage 170 is presented on a display device 150 to a website visitor, or a user, and includes a number of visual objects identifying a number of commodities for sale, e.g., 171-173. A visual object may contain any suitable indicative attributes that are well known in the art to indicate the existence of an introductory page upon user interaction. In response to a user selection of one of the commodity item 172, such as by positioning the cursor on the corresponding visual object, a window encompassing at least a part of the introductory document 160 overlays on the webpage 170. In this manner, the website visitor can conveniently view an aggregation of related information and personalized subject matter provided by a stack author without the need to personally visit the other websites.

It will be appreciated that any suitable local or remote database server may act as an information source to provide information related to a specified commodity to a client device in accordance with the present disclosure. An information source may be specified by a stack author or preselected in accordance with any suitable measure. Also, any suitable method can be used to retrieve information from an information source for purposes of practicing the present disclosure. More than one information source accessible to a stack author can be used to provide annotation for a commodity item by virtue of network connections, e.g. WAN, LAN, or WiFi. For example, the information source can be any well-known information website, such as Wikipedia, Baidu Baike, Canadian Encyclopedia, Credo Reference, EcuRed, or Grolier Multimedia Encyclopedia. The information sources may contain image, video, or audio content, in addition to text-related content that are presentable on an electronic device.

With respect to acquiring information for an automated section, the present disclosure is not limited to any specific mechanism of identifying related information from an external source. For instance, to generate an introductory page for a book item, a section containing a collection of introductory pages of related books may be generated automatically in accordance with relatedness to a topic of a chapter of the ebook. Further, the present disclosure is not limited by any mechanism of mining relevant external information from external information source sites and establishing hyperlinks thereto. In some embodiments, the hyperlinks may result from a wikification process including a disambiguation process.

FIG. 2 is a flow chart illustrating an exemplary computer implemented method 200 of generating an introductory document for a commodity by incorporating external information and personalized subject matter in accordance with an embodiment of the present disclosure. At 201, a page template comprising a plurality of user-authored sections and automatically populated sections, or automated sections, is accessed. In some embodiments, the page template may be selected from a number of available options by a stack author with each option having different sections, layout, and/or presentation format.

At 202, respective GUIs corresponding to the user-authored sections are displayed to receive stack author's input for these sections. In some embodiments, method 200 can be performed on a server device, e.g., hosted by an on-line store or a book publisher, while the respective GUIs can be rendered on a remote client device to receive input which is then communicated to the server device for processing. In some other embodiments, method 200 can be performed on the same computing device that receives stack author input locally.

At 203, the information sources are accessed to acquire external relevant information eligible for the automatically populated sections, e.g., based on the field indexes associated therewith. The information sources may be predefined by the template, for example according to the classification of the commodity. The present disclosure is not limited to any specific event that prompts the access to the external information sources and the subsequent population of the automated sections. At 204, the external relevant information is mapped to corresponding automatically populated sections. At 205, an introductory document that incorporates the stack author input in the user-authored sections and the external information in the automatically populated sections can be generated and output.

As will be appreciated by those skilled in the art, an introductory document according to the present disclosure can be generated for any type of commodity or commodity for any suitable purposes, such as books, movies, music, photos, art pieces, videos, clothes, furniture, food, toys, devices, appliances, health products, tickets, services, and human resources, to name a few.

Figure 3:
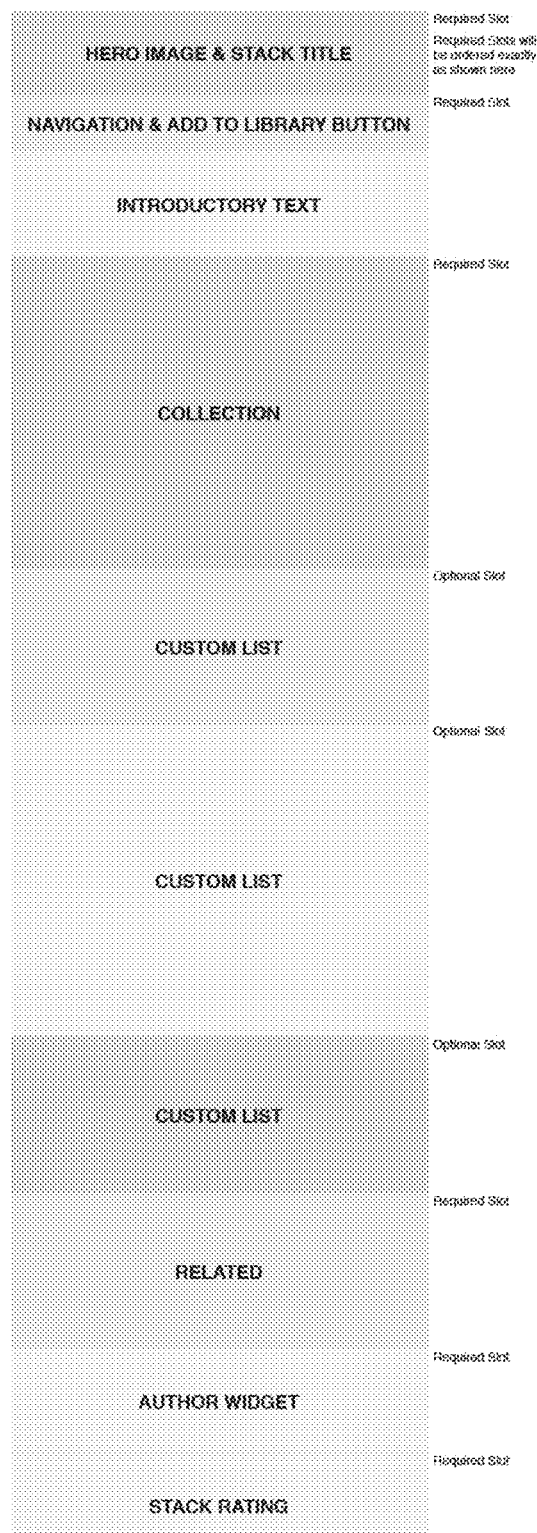
FIG. 3 is a diagram illustrating exemplary sections of an introductory page template designed for book items in accordance with an embodiment of the present disclosure.

As will be appreciated by those skilled in the art, the present disclosure is not limited to any specific content, specific layout or specific format in the predetermined template as well as in the outcome introductory document. FIG. 3 is a diagram illustrating exemplary sections of an introductory page template 300 designed for book items in accordance with an embodiment of the present disclosure. The page template 300 is a flow-view page with each section assigned with a fixed width and a maximum height. The user-authored sections include required sections "hero image & stack title," "introductory text," "collection," and a few optional "custom list" sections; and the automated sections include "related," "author widget" and "rating."

Figure 4:
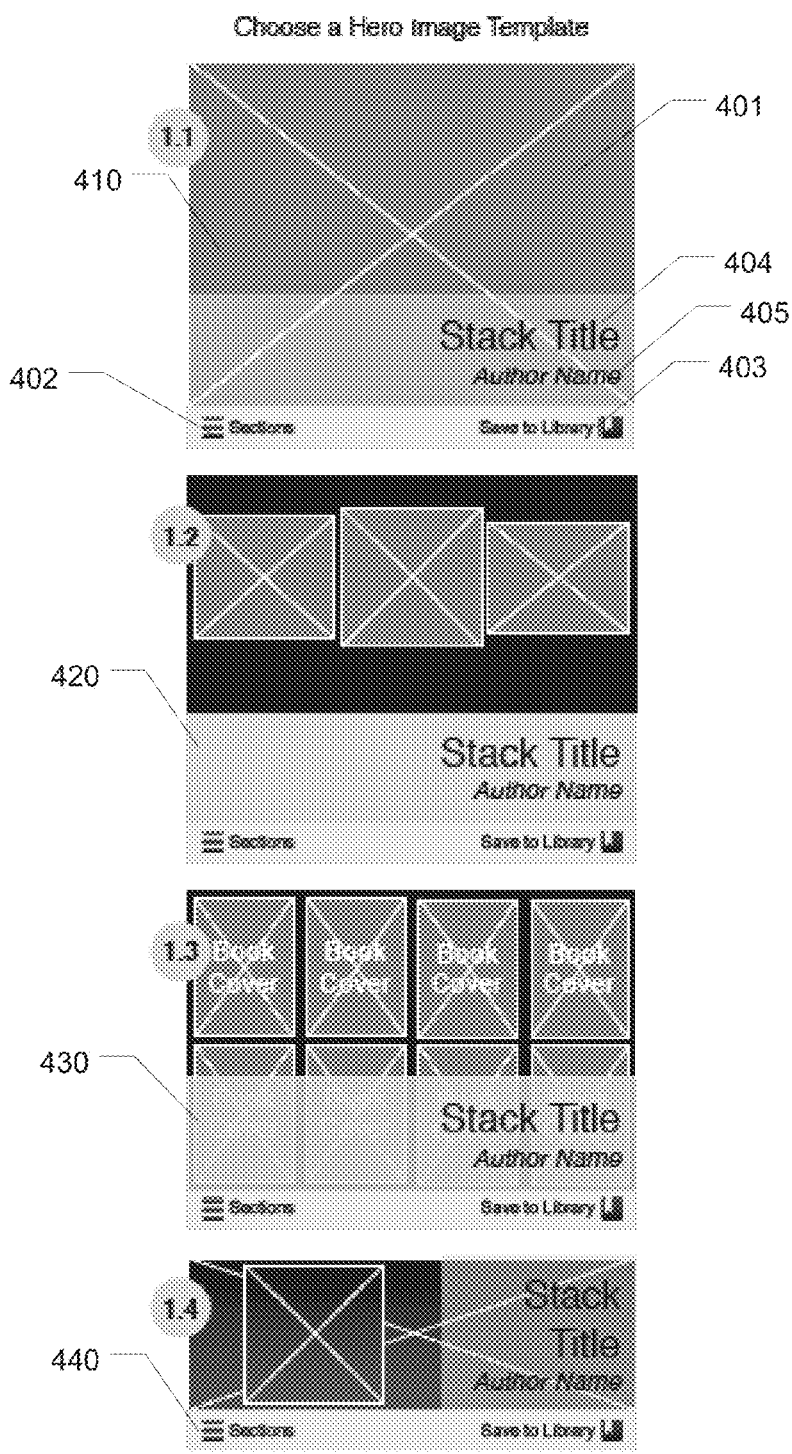
FIG. 4 illustrates an exemplary on-screen GUI designed for book items and configured to display available template options for a "hero image" section in accordance with an embodiment of the present disclosure.

For an individual section, several layouts may be predefined by the page template and available for a stack author's selection. FIG. 4 illustrates an exemplary on-screen GUI 400 designed for book items and configured to display available template options for a "hero image" section in accordance with an embodiment of the present disclosure. A stack author can choose a section template from the choices 410, 420, 430 and 440. Each template includes slots for image, e.g., 401 a sections menu button, e.g., 402, a "save to library" button e.g., 403, a stack title, e.g., 404, and the stack author's name, e.g., 405.

In the illustrated examples, template 420 and 430 allow the user to automatically generate a hero image by either pulling in book covers from a "collection" section of the same introductory page or pulling in an image from other sections within the same introductory page. Template 410 can accommodate a high resolution image that can be uploaded by the user. Template 420 allows a user to copy an image from a "custom list" section to create the hero image mosaic. Template 430 allows a user to copy book covers from book in the "collection" section to create the hero image mosaic. Template 440 allows a hero image background to be created from colors in the small hero image. A populated "hero image" section can be saved in response to a user's instruction through the "save to library" button 403.

Figure 5B:
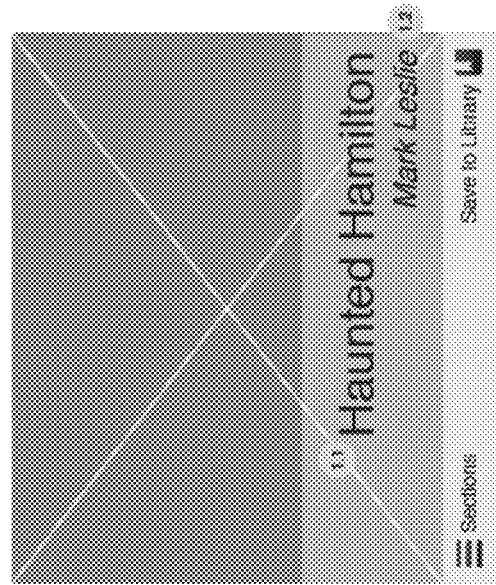
FIG. 5B illustrates an exemplary outcome "hero section" GUI populated with stack author's typed entry as shown in FIG. 5A in accordance with an embodiment of the present disclosure.
Figure 5A:
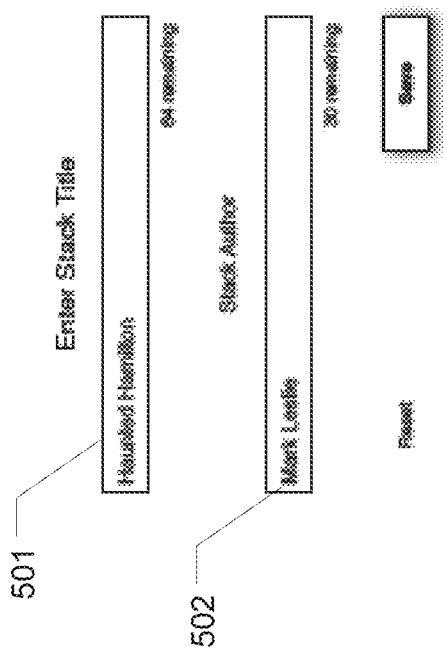
FIG. 5A illustrates an exemplary on-screen GUI designed for book items and configured to receive stack author's input for the stack title and the stack author input from a user in accordance with an embodiment of the present disclosure.

FIG. 5A illustrates an exemplary on-screen GUI 510 designed for book items and configured to receive a stack author's input for the stack title and the stack author input from a user in accordance with an embodiment of the present disclosure. The GUI 510 includes text entry regions 501 and

502 designated to receive typed entry for the stack title and the stack author. The text entry in a text field, e.g., 501 and 502, may be limited to a certain character limit. The stack author's input, including the image and text, can then presented in a format defined by a selected template. FIG. 5B illustrates an exemplary outcome "hero section" 520 GUI populated with stack author's typed entry as shown in FIG. 5A in accordance with an embodiment of the present disclosure.

FIG. 6A illustrates an exemplary on-screen GUI 610 designed for book items and configured to receive input for an "introduction" section and the "stack author" section from a stack author in accordance with an embodiment of the present disclosure. The GUI 610 includes respective text entry regions 601 and 602. The stack author can also add links to social mediate presences 605 and a profile photo via an image uploading tool 606.

FIG. 6B illustrates exemplary outcome "introduction" section and the "stack" section 620 populated with personalized input as shown in FIG. 6A in accordance with an embodiment of the present disclosure. In this embodiment, the stack author is able to add a "more-tag" to truncate the text after a specified number of words. When a website visitor selects the "continue reading" button 603, a text area may be expanded in line. The "more about stack author" button 604 is linked to an "author widget" section 630 which may provide additional information about the stack author.

Figure 7A:
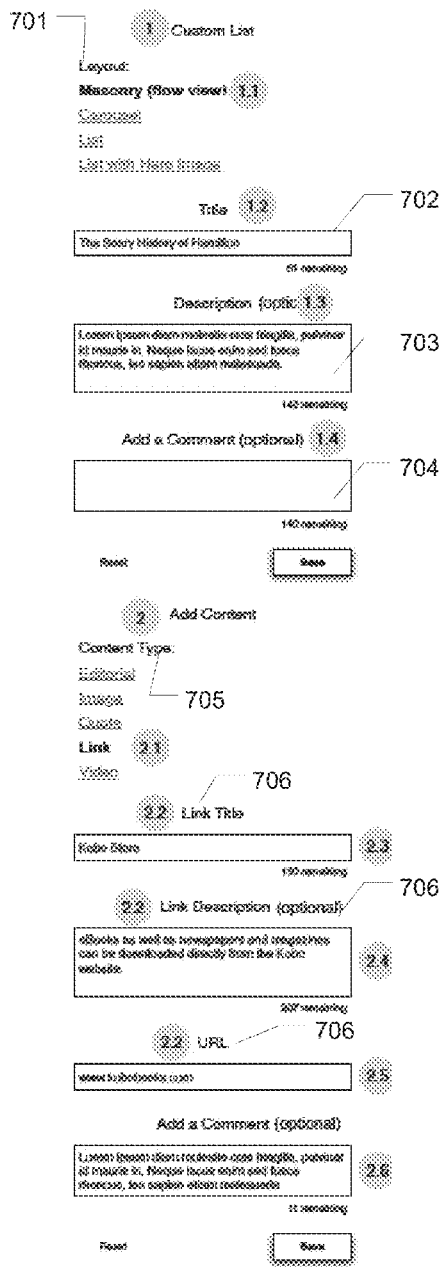
FIG. 7A illustrates an exemplary on-screen GUI designed for book items and configured to receive user input for a "custom list" section in accordance with an embodiment of the present disclosure.
Figure 7B:
FIG. 7B illustrates an outcome exemplary "custom list" populated with stack author input as shown in FIG. 7A in accordance with an embodiment of the present disclosure.

FIG. 7A illustrates an exemplary on-screen GUI 710 designed for book items and configured to receive user input for a stack author defined section, or a "custom list" section, in accordance with an embodiment of the present disclosure. A stack author is allowed to select a layout, e.g., flow view, for this section through the layout selection menu 701. The GUI 710 also includes text entry areas for a title 702, a description 703, and a stack author's comment 704, any of which may be optional as defined by the template. An optional section without a stack author's input or as deselected by a stack author may be removed from presentation in the outcome introductory document. The content type can be selected through the "content type" menu 705. The form fields 706 in the "authoring tool" may only display fields that are relevant to the selected content type. FIG. 7B illustrates an outcome exemplary "custom list" populated with stack author input as shown in FIG. 7A in accordance with an embodiment of the present disclosure.

Figure 8:
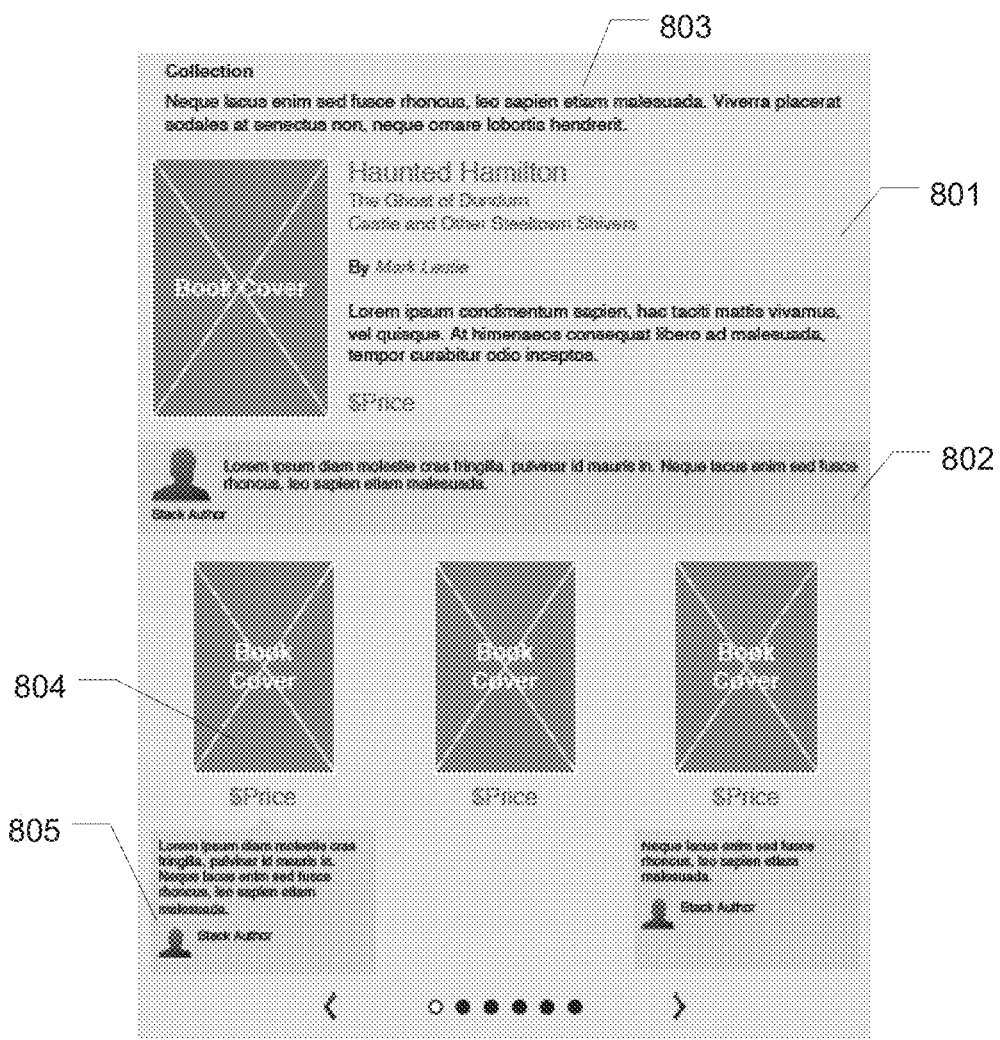
FIG. 8 illustrates an exemplary "collection" section designed for book items and populated with stack author input in accordance with an embodiment of the present disclosure.

FIG. 8 illustrates an exemplary "collection" section designed for book items and populated with stack author input in accordance with an embodiment of the present disclosure. This section includes a list of books chosen by the stack author. In the corresponding exemplary template, there is an optional "hero book" 801 placement available for the stack author to highlight one book from the collection list. Each book in the collection can have a stack author comment 802 subject to a maximum character limit. The stack author user can add an optional description 803 for this section. When a visitor selects a book, e.g., 804, a native overview page 805 can be opened.

Figure 9:
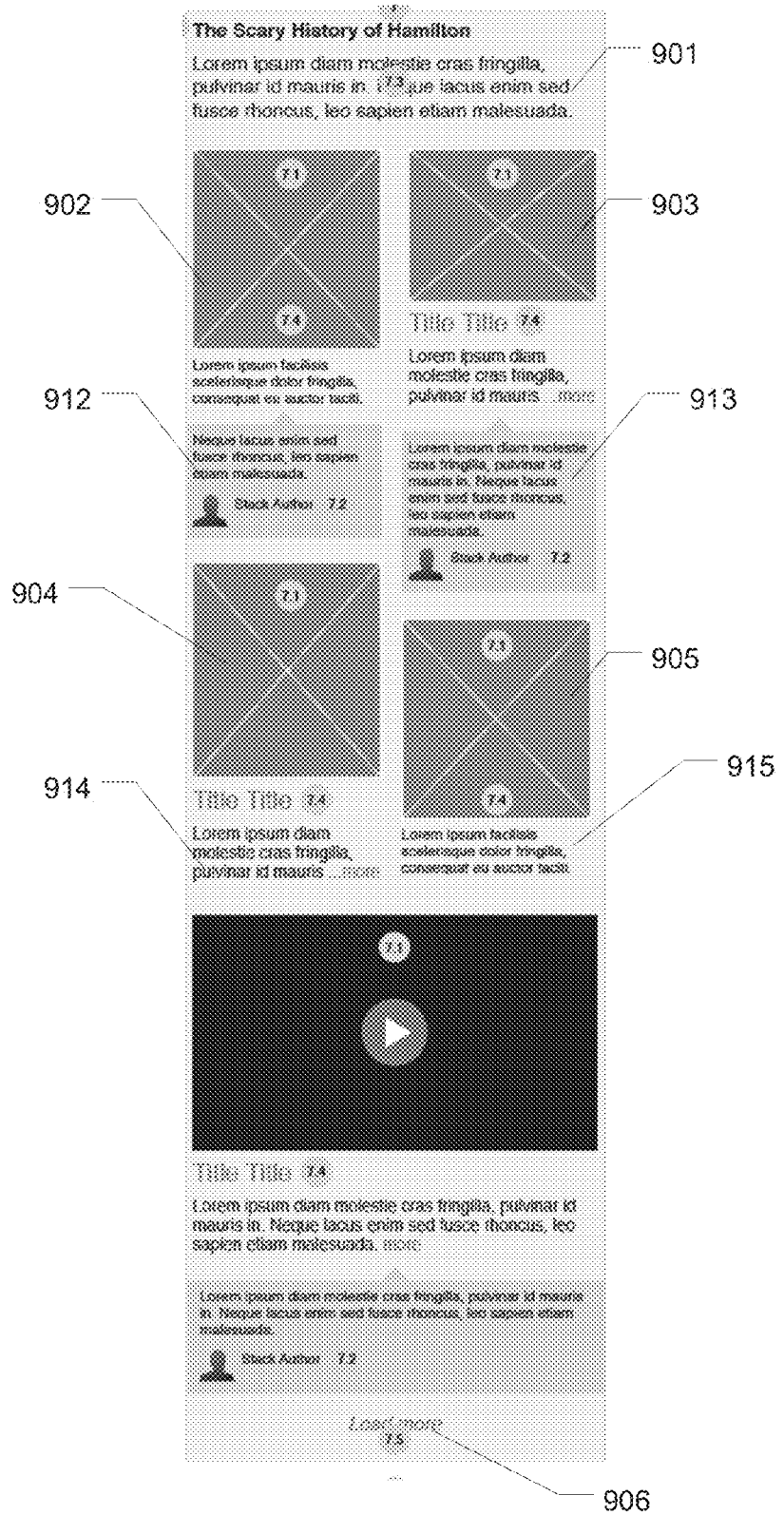
FIG. 9 illustrates an exemplary "custom list" section populated with stack author input in accordance with an embodiment of the present disclosure.

FIG. 9 illustrates an exemplary "custom list" section populated with stack author input in accordance with an embodiment of the present disclosure. In this example, the stack author entered the subject of "The scary history of Hamilton" to the section and selected a flow view layout for it. Each post, e.g., 902, 903, 904, or 905, in the list can have a stack author's comment, e.g., 912, 913, 914, or 915, subject to a maximum character limit. The stack author added a description 901 following the section title. A post may be represented by a hero image or a video in the list and may be linked with an external source which is up to the stack author's specification. The collection list may have a default number of posts which may vary depending on an operating system that drives a display device used to display the introductory document. A visitor may load more posts inline by use of the "load more" button 906.

Figure 10:
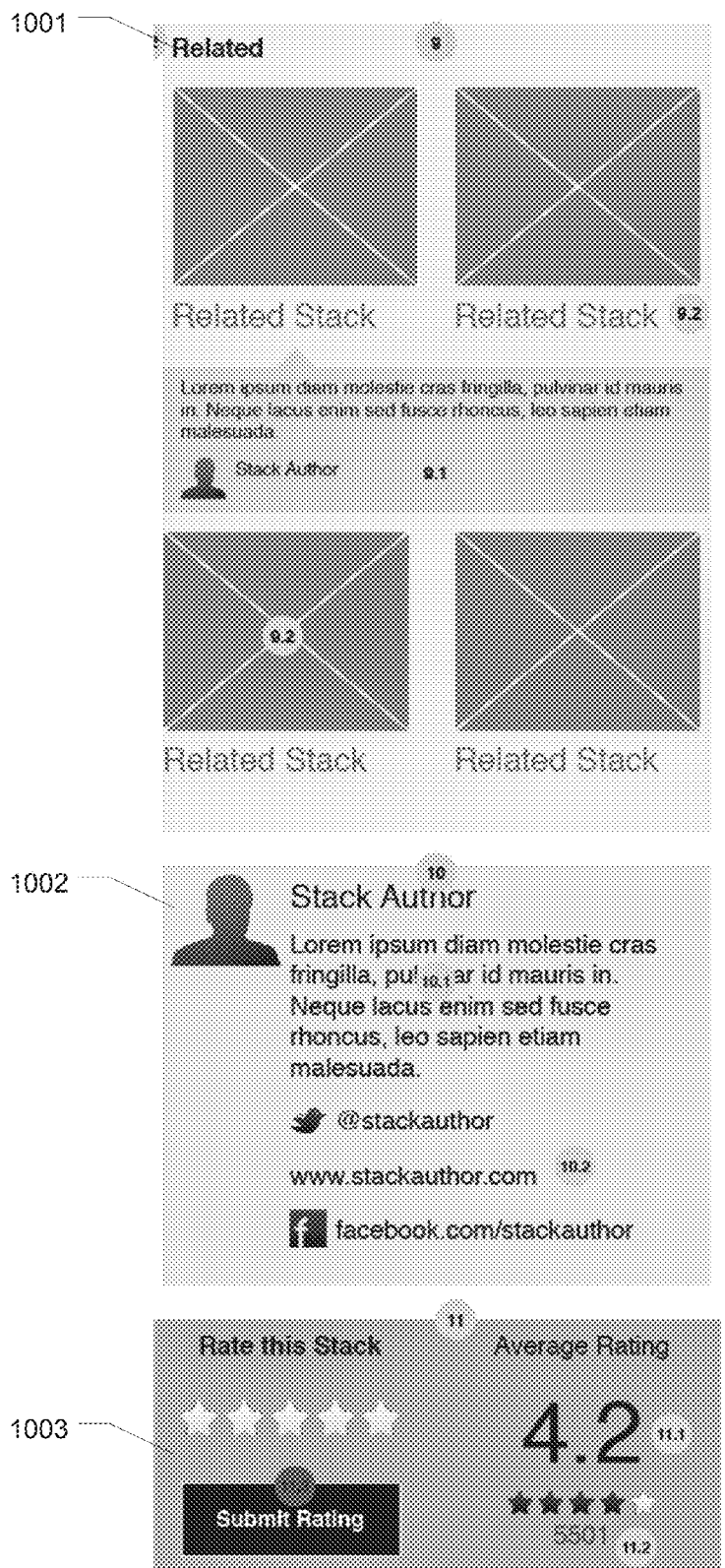
FIG. 10 illustrates exemplary automated sections populated with external source information in accordance with an embodiment of the present disclosure.

FIG. 10 illustrates exemplary automated sections ("automatically populated") sections populated with external source information in accordance with an embodiment of the present disclosure. In this example, the automated sections include a "related" section 1001, a "stack author widget" 1002 section, and a "stack rating" section 1003, each of which may include a stack author's comment. The "related" section includes a list of introductory documents of related book items. A visitor to the introductory document may select a tile in the list and view the linked introductory document. The "stack author widget" 1002 may be embedded with hyperlinks as specified by the stack author which may direct to social media presence of the stack author. The "stack rating" section 1003 displays the average rating and number of ratings on the introductory document.

An introductory document template may include any additional or different section regarding any suitable type of information that can be provided by any accessible information source or a stack author. In the illustrated examples, the template is configured to generate an introductory document GUI in a flow view form. However, the present disclosure is not limited to any particular layout. Based on the display capability of the device, e.g., depending on an operation system associated with the display device, or the model of a display device, the template in accordance with the present disclosure can vary and yet perform substantially the same functions as described above.

Figure 11A:
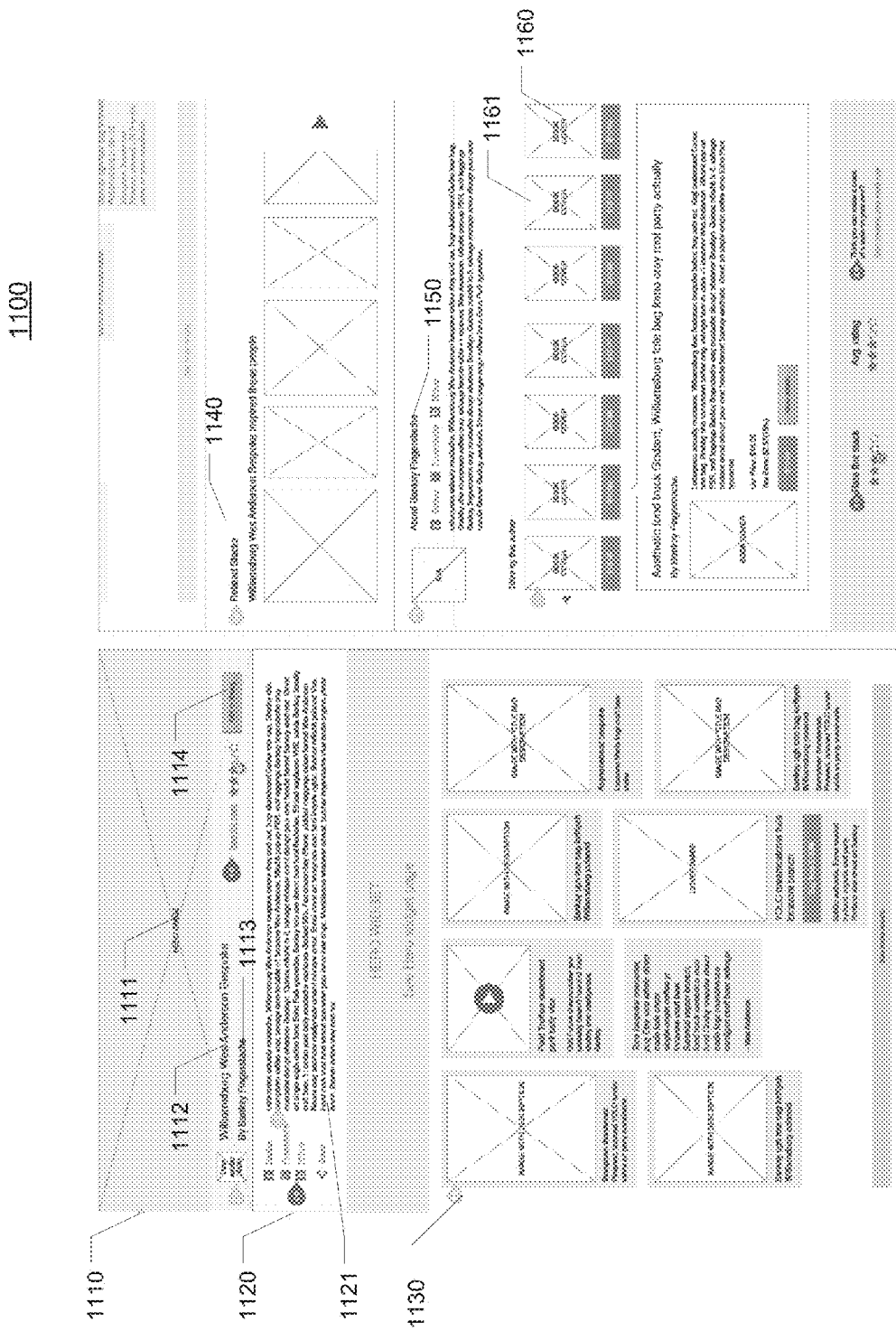
FIG. 11A illustrates a sample introductory document that is generated based on another exemplary wireframe designed for book items in accordance with an embodiment of the present disclosure.

FIG. 11A illustrates a sample introductory document 1100 that is generated based on another exemplary wireframe designed for book items in accordance with an embodiment of the present disclosure. The introductory document 110 comprises a "header widget" section 1110, a "user profile area" section 1120, a "hero widget" section 1130, "related stacks" section 1140, a "stack author widget" section 1150, and a "titles by this author" carousel 1160.

The "header widget" 1110 includes a stack hero image 1111, title 1112 and by-line 1113 displayed below, and an "add to library" button 1114. The large image header area may have a fixed size as specified by the template. In some embodiments, an image uploaded by a stack author may be scaled down proportionally. The stack author may be allowed to adjust the viewable area of the image. In some embodiments, a stack rating object may be displayed so that users can view the average ration of the stack and rate it themselves if logged-in. can also be The "user profile" 1120 section contains user avatar and stack description area 1121.

The "hero widget" section 1130 displays books, images, videos, editorial, quotes and linked material in a flow view, wherein some of the regions may be optional. The editorial may include content title, and editorial content. The quotes may include content title, quotation, attribution, and stack author description. In some embodiments, the books presented in this section may link to an item page; the images may open in a modal window; the videos may open in an embedded modal player; and the links may open in a new browser tab.

The "related stacks" section 1140 displays all relevant stacks and the stack author has input during stack generation. The "stack author widget" section 1150 may display avatar, social links, and about the author text. The "titles by this author" carousel 1160 displays a merch carousel for the stack author to promote their own products with each item being expandable with a more detailed view when a title is selected.

In some embodiments, the wireframe may further allow users to post the stack to their social feeds, rate stacks based on the quality of the content populated. Interested users may be allowed to learn about or create their own stacks.

Figure 11B:
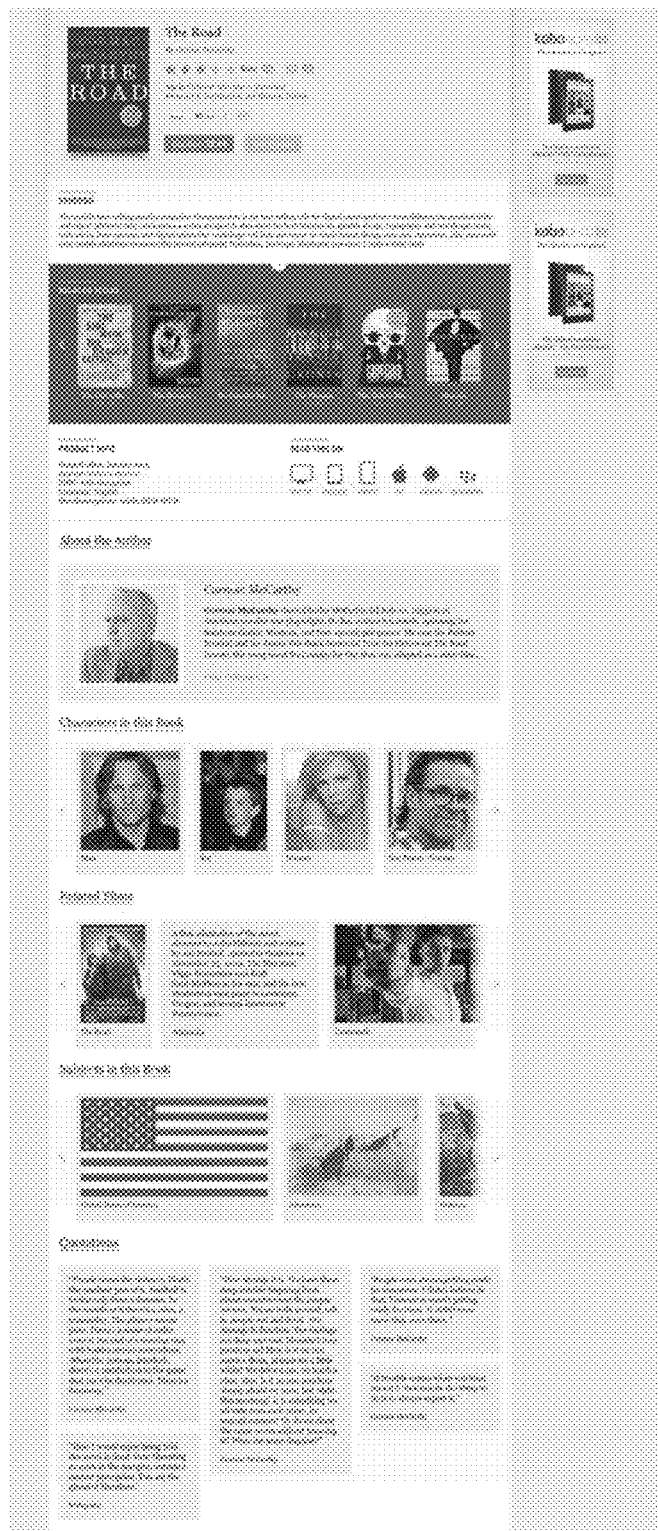
FIG. 11B illustrates an exemplary summary page for a book item presented in an introductory page that is generated in accordance with an embodiment of the present disclosure.
Figure 12:
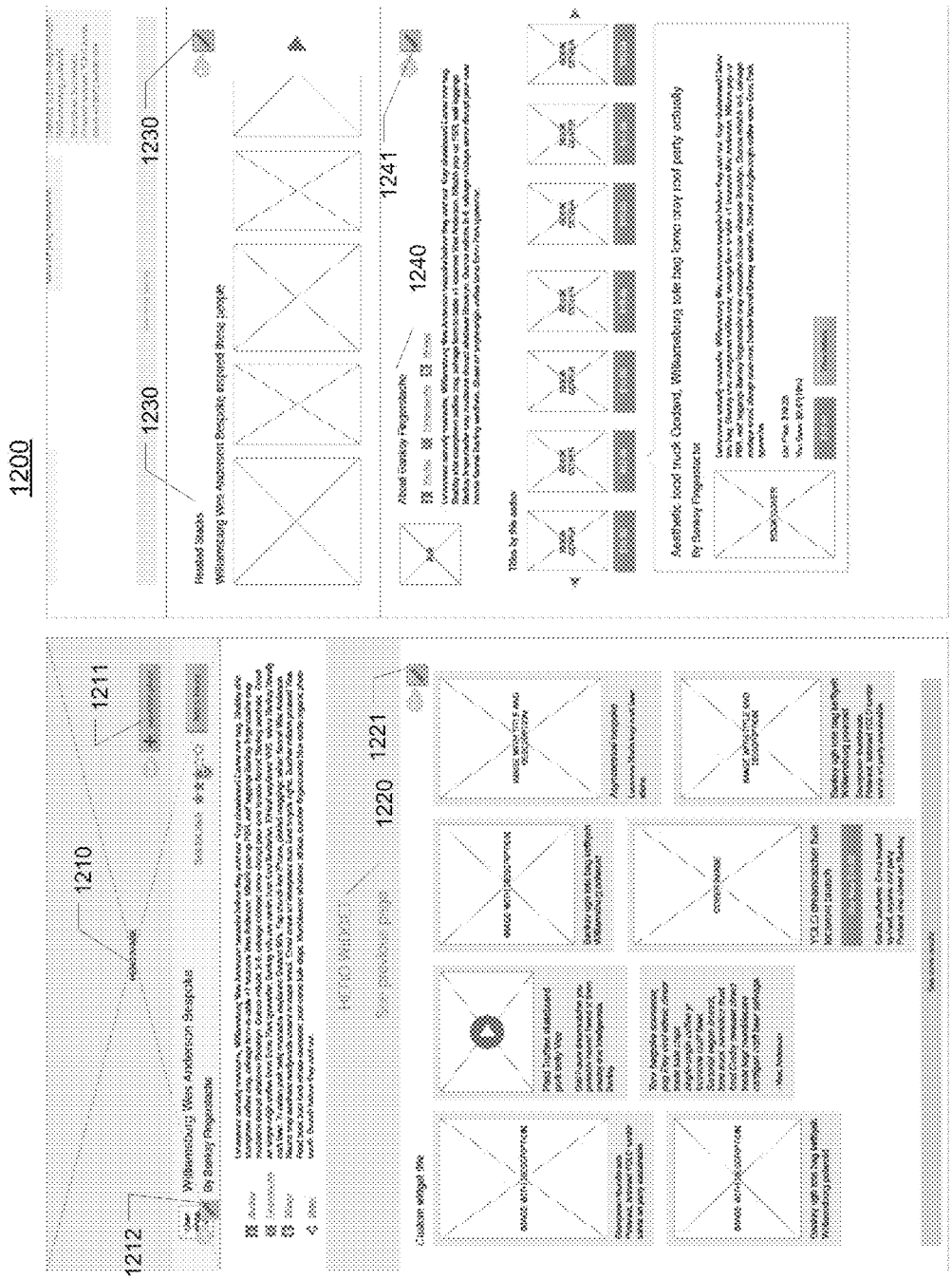
FIG. 12 illustrates a sample on-screen GUI designed for book items and configured to receive user input based on the exemplary wireframe associated with FIG. 11 in accordance with an embodiment of the present disclosure.

Any item presented or mentioned in an introductory document GUI may be associated with another GUI including additional information related to the item. FIG. 11B illustrates an exemplary summary page for a book item presented in an introductory page that is generated in accordance with an embodiment of the present disclosure. Display of the summary page may be triggered by a user interaction with a book item included in the "titles by this author" section 1160 in FIG. 11A. The summary page depicted is that of Cormac McCarthy's *The Road*. Any information relevant to the book *The Road* can be displayed therein, including information on the author, the characters in the book, related films, subjects mentioned in the book as well as quotations from the book or author FIG. 12 illustrates a sample on-screen GUI 1200 designed for book items and configured to receive user input based on the exemplary wireframe associated with FIG. 11 in accordance with an embodiment of the present disclosure. The GUI 1200 may be prompted after an authorized stack author logs in. In the "header image" section 1210, a "reposition photo" button 1211 can be used to enable a cross hair cursor, indicating the stack author able to click and drag to reposition the hero image as he or she sees fit. The button 1212 can redirect to the stack generation-author widget where the avatar image can be edited. The button 1221 in the "hero widget" section 1220 can redirect to the stack generation-collections, or custom widgets, where a stack author can edit the content. The button 1231 in the "related stacks" section 1230 can redirect to the stack generation-related stacks widget, where the related stack can be edited. The button 1241 in the "stack author widget" section 1240 can redirect to the stack generation-author widget, where the avatar image, "about the author", or the social links can be edited.

Figure 13C:
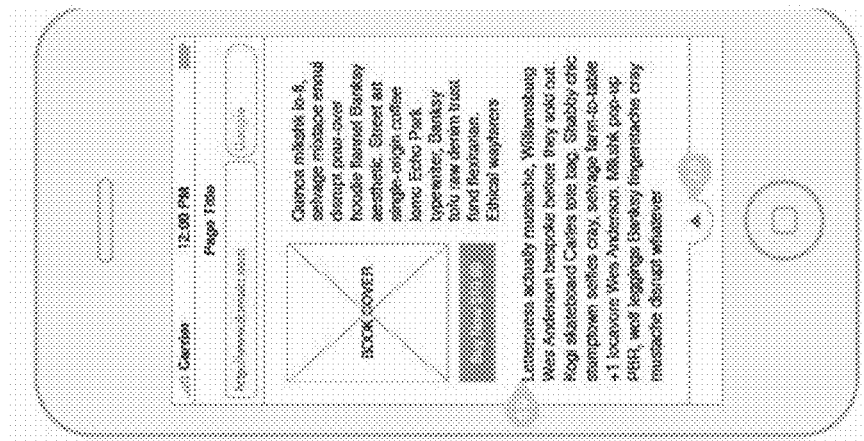
FIG. 13C illustrates an exemplary hero book GUI with expanded comment displayed on a smart phone device generated in accordance with an embodiment of the present disclosure.
Figure 13B:
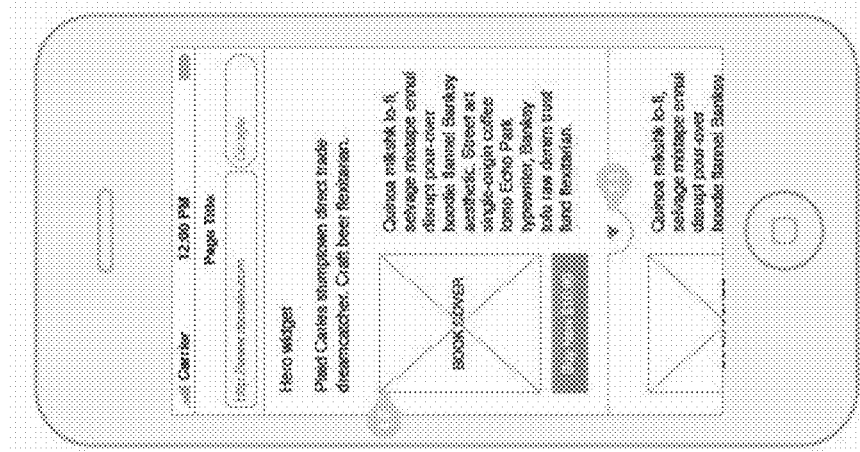
FIG. 13B illustrates a "hero widget" section of an exemplary introductory document GUI displayed on a smart phone device generated in accordance with an embodiment of the present disclosure.
Figure 13A:
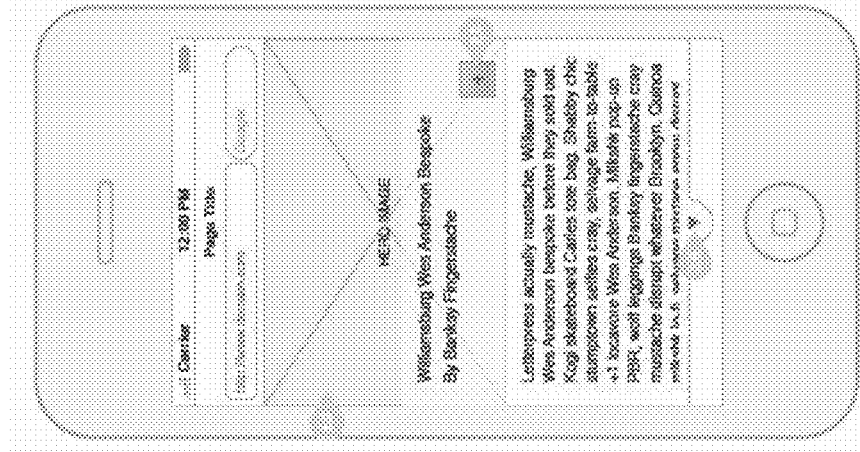
FIG. 13A illustrates a header area of an exemplary introductory document GUI displayed on a smart phone device generated in accordance with an embodiment of the present disclosure.
Figures 13F, 13G:
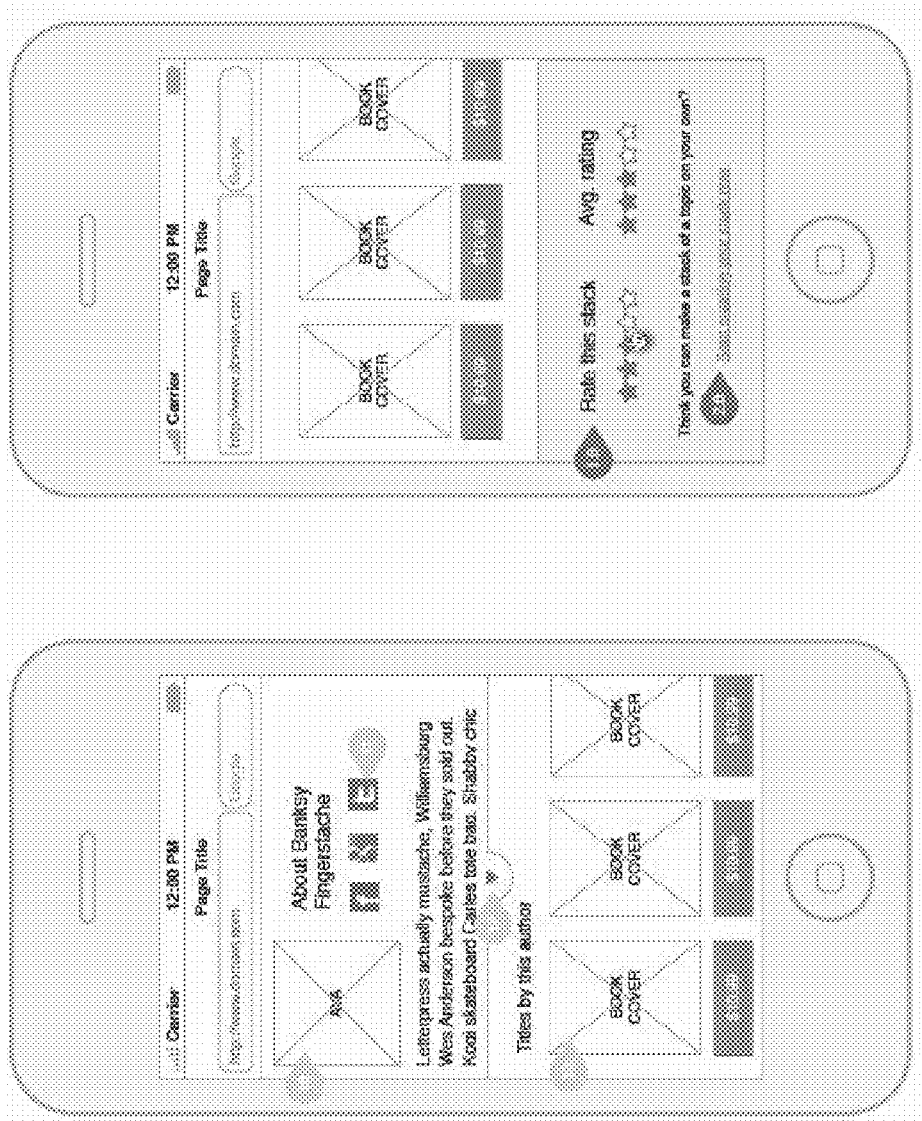
FIG. 13F illustrates an exemplary "stack author widget" GUI displayed on a smart phone device generated in accordance with an embodiment of the present disclosure.
FIG. 13G illustrates an exemplary "titles by this author" carousel GUI displayed on a smart phone device generated in accordance with an embodiment of the present disclosure.

FIG. 13A illustrates a header area of an exemplary introductory document GUI displayed on a smart phone device generated in accordance with an embodiment of the present disclosure. FIG. 13B illustrates a "hero widget" section of an exemplary introductory document GUI displayed on a smart phone device generated in accordance with an embodiment of the present disclosure. FIG. 13C illustrates an exemplary hero book GUI with expanded comment displayed on a smart phone device generated in accordance with an embodiment of the present disclosure. FIG. 13D illustrates another exemplary "hero widget" section GUI displayed on a smart phone device generated in accordance with an embodiment of the present disclosure. This GUI displays additional content items chosen by a device user. FIG. 13E illustrates an exemplary "related stacks" GUI displayed on a smart phone device generated in accordance with an embodiment of the present disclosure. FIG. 13F illustrates an exemplary "stack author widget" GUI displayed on a smart phone device generated in accordance with an embodiment of the present disclosure. FIG. 13G illustrates an exemplary "titles by this author" carousel GUI displayed on a smart phone device generated in accordance with an embodiment of the present disclosure.

Figure 14:
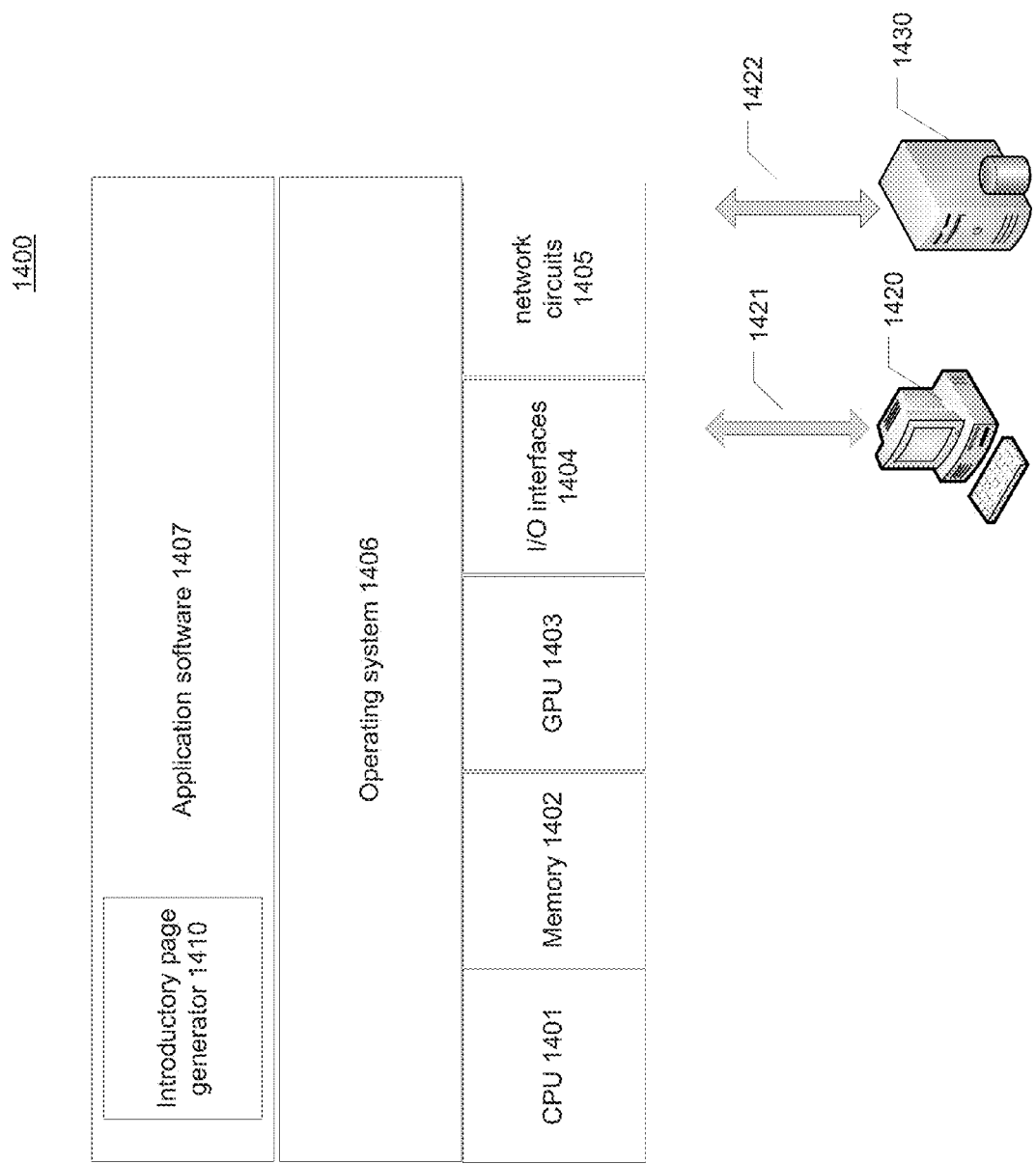
FIG. 14 is a block diagram illustrating an exemplary computing system including an introductory document generator in accordance with an embodiment of the present disclosure

FIG. 14 is a block diagram illustrating an exemplary computing system 1400 including an introductory document generator 1410 in accordance with an embodiment of the present disclosure. The computing system 1400 comprises a processor 1401, a system memory 1402, a GPU 1403, I/O interfaces 1404 and network circuits 1405, an operating system 1406 and application software 1407 including the introductory document generator 1410 stored in the memory 1402. In the illustrated example, the computing system 1400 is coupled to a client terminal 1420 through a communication channel 1421 and an external website server 1420 through a communication channel 1422.

When incorporating configuration input and personalized input from the client terminal 1420 and executed by the CPU 1401, the introductory document generator 1410 can automatically access external information, process the configuration and personalized input and the external source information through a wireframe, and generate an introductory document pertaining to a specified commodity in accordance with an embodiment of the present disclosure. The introductory document generator 1410 may perform various other functions as discussed in details with reference to FIG. 1-FIG. 13. As will be appreciated by those with ordinary skill in the art, the introductory document generator 1410 can be implemented in any one or more suitable programming languages that are known to those skilled in the art, such as C, C++, Java, Python, Perl, C#, SQL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of generating an introductory document related to a commodity, said method comprising:

accessing a predetermined template that comprises a plurality of sections arranged in respective page locations, wherein said plurality of sections comprise user-authored sections and automated sections, wherein each automated section is associated with a respective field index;

rendering and displaying a first graphic user interface (GUI) for display in response to a corresponding user request, wherein said first GUI is associated with a first user-authored section and comprises a visual object configured to receive user input;

accessing one or more information sources;

selecting relevant information from said one or more information sources for respective automated sections based on respective field indexes associated therewith, wherein said relevant information pertains to said commodity and includes information on related commodity relevant to said commodity;

associating said relevant information with respective automated sections; and generating said introductory document that comprises said user input assigned to said first user-authored section and said relevant information assigned to said respective automated sections, wherein said commodity is a book, and said related commodity relevant to said commodity is automatically generated in accordance with relatedness to a topic of a chapter of the book read by a user by changing said related commodity according to the topic of the chapter read by the user.

2. The computer implemented method of claim 1, wherein said one or more information sources are selected from a group consisting of a digital encyclopedia database, a local information database, a website hosted by another user, and wherein said one or more information sources are predetermined based on said commodity.

3. The computer implemented method of claim 1, wherein said user-authored sections comprise a hero image section, an introductory document title section, an introductory text section, and user-defined sections, wherein said user-authored sections comprise required sections and optional sections, and wherein said automated sections comprise a rating section, a related information section, and a user-author information section.

4. The computer implemented method of claim 1, further comprising removing a user-selected section from said introductory document in response to user instructions; and wherein said generating comprises generating said introductory document in accordance with a layout that is selected from a plurality of layout options provided by said predetermined template.

5. The computer implemented method of claim 1, wherein said first GUI comprise a menu object configured to receive a user selection from predefined options with respect to a presentation format of said user input in said introductory document.

6. The computer implemented method of claim 1 further comprising associating said introductory document with an identification, wherein said identification is discoverable by a web search engine.

7. The computer implemented method of claim 1, wherein said user input comprises an image file, a video file, an audio file, a typed writing, or a selection from a list of options provided by said predetermined template.

8. The computer implemented method of claim 1, wherein said relevant information includes information on an author of the book.

9. A non-transitory computer-readable storage medium embodying instructions that, when executed by a processing device, cause the processing device to perform a method of generating an introductory page for a selected commodity, said method comprising:
   accessing a predetermined page layout that comprises a plurality of fields arranged in respective page locations, wherein each field is associated with an information category, wherein said plurality of fields comprise user-authored fields and automated fields;
   rendering a menu graphic user interface (GUI) for display, wherein said menu GUI comprises selectable objects associated with said plurality of fields respectively;
   rendering and displaying a respective GUI for display in response to a user interaction with a selectable object associated with a user-authored field, wherein said respective GUI comprises a user input region configured to receive a user input;
   accessing information sources;
   selecting relevant information pertaining to said selected commodity for respective automated fields from said information sources based on corresponding information categories associated with said respective automated fields, said relevant information including information on related commodity relevant to said commodity;
   assigning said relevant information to said respective automated fields; and
   generating an introductory page comprising said user input and said relevant information that are arranged in respective fields in accordance with said predetermined page layout, wherein said commodity is a book, and said related commodity relevant to said commodity is automatically generated in accordance with relatedness to a topic of a chapter of the book read by a user by changing said related commodity according to the topic of the chapter read by the user.

10. The non-transitory computer-readable storage medium of claim 9, wherein said information source is a database document accessible through a communication network, and wherein said selected commodity is a book for sale on an on-line store, and wherein said user input is provided by an author of said book.

11. The non-transitory computer-readable storage medium of claim 9, wherein said user-authored fields comprise a hero image field, an introductory page title field, an introduction text field, and a plurality of user-defined fields, wherein said automated fields comprise a rating field, a related collection field, and an author information field, and wherein each of said automated fields corresponds to a respective information source.

12. The non-transitory computer-readable storage medium of claim 9, wherein said method further comprises rendering a page layout menu GUI configured to receive a user selection from a plurality of predetermined page layouts.

13. The non-transitory computer-readable storage medium of claim 9, wherein said generating comprises generating an introductory page in a format specific to an electronic device that is selected to display said introductory page.

14. The non-transitory computer-readable storage medium of claim 9, wherein said user input comprises an uploaded file, a user selection, or a text entry.

15. The non-transitory computer-readable storage medium of claim 9, wherein said generating comprises generating an introductory page in a format specific to a selected electronic device used to display said introductory page.

16. The non-transitory computer-readable storage medium of claim 9, wherein each of said plurality of fields is associated with a plurality of available display formats, and wherein a display format of a respective field is determined by a user selection.

17. A system comprising:
   processing circuitry;
   a communication circuit; and
   a memory coupled to said processing circuitry and comprising instructions that, when executed by said processing circuitry, cause the system to perform an method of generating an information page for an electronic book, said method comprising:
      accessing a predetermined template that comprises a plurality of sections arranged in respective page locations, wherein each section is associated with a field index, wherein said plurality of sections comprise user-authored sections and automated sections;
      rendering and displaying a first graphic user interface (GUI) for display in response to a corresponding user interaction with said display device, wherein said first GUI is associated with a first user-authored section and comprises an input entry area configured to receive user input;
      accessing one or more information sources;
      selecting relevant information from said one or more information sources for said automated sections based on respective field indexes associated with said automated sections, wherein said relevant information pertains to said electronic book and includes information on related commodity relevant to said commodity;

associating respective relevant information with each automated section according to said predetermined template; and generating said information page to be displayed, wherein said information page comprises said user input and said relevant information based on said predetermined template, wherein said commodity is a book, and said related commodity relevant to said commodity is automatically generated in accordance with relatedness to a topic of a chapter of the book read by a user by changing said related commodity according to the topic of the chapter being read by the user.

18. The system of claim 17, wherein said one or more information sources are selected from a group consisting of a digital encyclopedia database, a local information database, a website hosted by another user, wherein said one or more information sources are determined based on said electronic book, wherein said user-authored sections comprise a hero image section, a title section, an introduction section, and a user-defined section, and wherein said automated sections comprise a rating section, a related information section, and an author information section.

19. The system of claim 17, wherein said generating comprises generating said information page in accordance with a layout selected by a user from a plurality of layout options associated with said predetermine template, and wherein said user-authored sections comprise optional sections.

20. The system of claim 17, wherein said first GUI comprise a menu object configured to receive a user selection from predefined options on a format for displaying said user input in said information page, and wherein said user input comprises a user-uploaded image file, video file or audio file, or a typed entry.

\* \* \* \* \*